(12) United States Patent
Panda et al.

(10) Patent No.: US 9,171,086 B1
(45) Date of Patent: Oct. 27, 2015

(54) WEBSITE DURATION PERFORMANCE BASED ON CATEGORY DURATIONS

(71) Applicant: Google Inc., Mountain View, CA (US)

(72) Inventors: Navneet Panda, Mountain View, CA (US); James A. Kunz, San Jose, CA (US)

(73) Assignee: Google Inc., Mountain View, CA (US)

( * ) Notice: Subject to any disclaimer, the term of this patent is extended or adjusted under 35 U.S.C. 154(b) by 271 days.

(21) Appl. No.: 13/964,752

(22) Filed: Aug. 12, 2013

(51) Int. Cl.
*G06F 17/30* (2006.01)

(52) U.S. Cl.
CPC .................. *G06F 17/30867* (2013.01)

(58) Field of Classification Search
CPC ............... G06F 17/30876; G06F 17/30867
See application file for complete search history.

(56) References Cited

U.S. PATENT DOCUMENTS

| | | | |
|---|---|---|---|
| 8,898,297 B1* | 11/2014 | Taylor et al. | 709/224 |
| 2006/0155764 A1* | 7/2006 | Tao | 707/104.1 |
| 2010/0268834 A1* | 10/2010 | Eidelman et al. | 709/230 |
| 2011/0258148 A1 | 10/2011 | Gao et al. | |
| 2012/0005132 A1 | 1/2012 | Horvitz et al. | |
| 2012/0060083 A1* | 3/2012 | Yuan et al. | 715/234 |
| 2012/0173363 A1* | 7/2012 | Soroca et al. | 705/26.3 |
| 2014/0019453 A1* | 1/2014 | Mohan et al. | 707/738 |

* cited by examiner

*Primary Examiner* — Mohammad S Rostami
(74) *Attorney, Agent, or Firm* — Fish & Richardson P.C.

(57) ABSTRACT

Methods, systems, and apparatus, including computer programs encoded on a computer storage medium, for determining duration performance of websites. In one aspect, a method includes, for each of a plurality of websites, obtaining duration measurements of user device session visits to resources of the website, obtaining data describing a plurality of categories to which the website belongs; determining for each of the plurality of categories to which the website belongs, a category duration score based on the duration measurements, each category durations score being proportional to durations of time from the duration measurements; and determining from one or more of the category duration scores, a duration performance score for the website, the duration performance score proportional to the one or more category duration scores from which the duration performance score is determined.

17 Claims, 3 Drawing Sheets

WEBSITE DURATION PERFORMANCE BASED ON CATEGORY DURATIONS

BACKGROUND

This specification relates to generating website scores that are used in search operations in an Internet search engine.

The Internet enables access to a wide variety of resources, such as video or audio files, web pages for particular subjects, book articles, or news articles. A search engine can identify resources in response to a user query that includes one or more search terms or phrases. The search engine ranks the resources based on their relevance to the query and importance and provides search results that link to the identified resources, and orders the search results according to the rank.

A website is one or more resources associated with a domain name, and one or more servers host each website. Websites are maintained by publishers that manage and/or own the websites. Search engines, in addition to evaluating resources alone, may also take into account scores and measurements regarding the website to which the resources belong when scoring the resources for search operations.

SUMMARY

In general, one innovative aspect of the subject matter described in this specification can be embodied in methods that include the actions of: for each of a plurality of websites, each website being a collection of resources served from a domain: obtaining, by a data processing apparatus, duration measurements of user device session visits to resources of the website, each duration measurement being a duration of time that elapses between a user device requesting the resource and the user device requesting another resource, and the user device session visits being a sequence of visits to resources of the website without an intervening visit to a resource of another website; obtaining, by the data processing apparatus, data describing a plurality of categories to which the website belongs; determining, by the data processing apparatus, for each of the plurality of categories to which the website belongs, a category duration score based on the duration measurements, each category durations score being proportional to durations of time from the duration measurements; and determining, by the data processing apparatus, from one or more of the category duration scores, a duration performance score for the website, the duration performance score proportional to the one or more category duration scores from which the duration performance score is determined. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Website duration performance scores representing a measure of duration performance for websites can be computed. The website duration performance scores can represent a category-dependent measure of the usefulness of the information available on resources found in the websites. The website duration performance scores can be used to rank search results according to the websites in which the resources identified by the results are found. The website duration performance score for a website can be used as a term in the computation of scores for resources that are in the website. A high website duration performance score for a particular website can be used to determine how other attributes are used to score resources in that website, thereby resulting in more robust scoring algorithms. Website duration performance scores can be used in determining whether resources in a website are of sufficiently high duration performance to be crawled, refreshed, or added to an index of resources by a search engine, thereby allocating resources efficiently.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
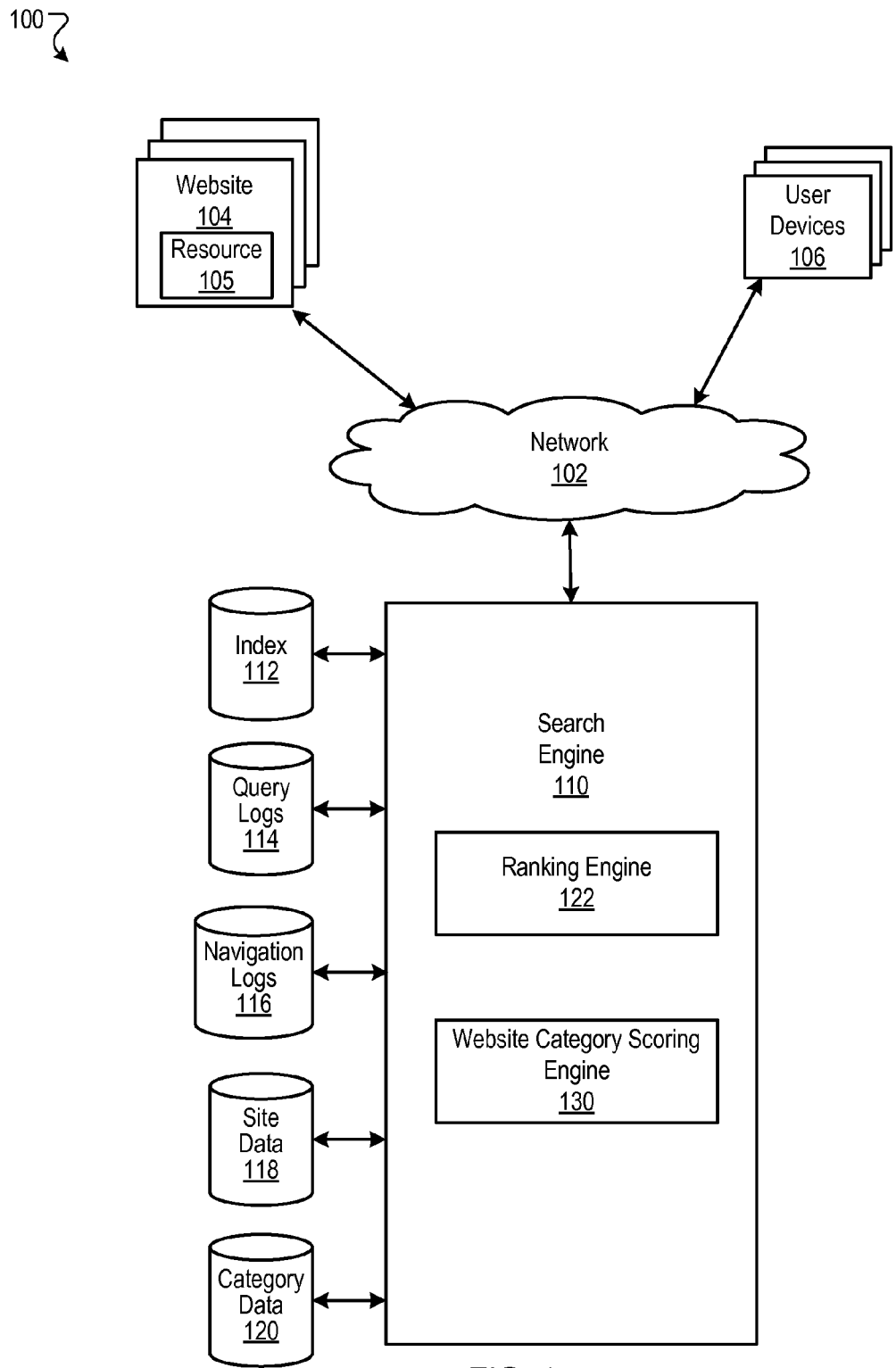
FIG. 1 is a block diagram of an example environment in which website duration performance scores are determined.

FIG. 1 is a block diagram of an example environment 100 in which website duration performance scores are determined. A computer network 102, such as a local area network (LAN), wide area network (WAN), the Internet, or a combination thereof, connects publisher websites 104, user devices 106, and the search engine 110. The online environment 100 may include many thousands of publisher websites 104 and user devices 106.

A website 104 includes one or more resources 105 associated with a domain and hosted by one or more servers in one or more locations. A resource 105 is any data that can be provided by a publisher website 104 over the network 102 and that has a resource address, e.g., a uniform resource locator (URL). Resources may be HTML pages, electronic documents, image files, video files, audio files, and feed sources, to name just a few. The resources may include embedded information, e.g., meta information and hyperlinks, and/or embedded instructions, e.g., client-side scripts.

Generally, a website is a collection of resources formatted in hypertext markup language (HTML) that can contain text, images, multimedia content, and programming elements, for example, scripts. Each website 104 is maintained by a content publisher, which is an entity that controls, manages and/or owns the website 104.

Some websites are specific to a domain name, but multiple websites can share a same domain name. For example, a social network that has a domain name, e.g., example_social.com, may host multiple websites that are each maintained by a respective entity, e.g., www.example_social.com/site1/ . . .
www.example_social.com/site2/ . . .

and so on. Each of the websites above may include multiple resources, e.g., www.example_social.com/site1/resource1, www.example_social.com/site1/resource2, and so on. Additionally, a website may be host specific. For example, each of the following hosts, which share a domain name, many nevertheless constitute different websites:

en.example_site.com/
fr.example_site.com/

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website on the World Wide Web or a local area network.

To facilitate searching of these resources 105, the search engine 110 identifies the resources by crawling the publisher websites 104 and indexing the resources provided by the publisher websites 104. The resources are indexed and the index data are stored in an index 112.

The user devices 106 submit search queries to the search engine 110. The search queries are submitted in the form of a search request that includes the search query and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 includes a ranking engine 122 that scores the resources, and the search engine 110 provides search results that reference the resources to the user devices 106 in a search results page. A search result is data generated by the search engine 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries submitted from user devices 106 are stored in query logs 114. Selection data for the queries and the web pages referenced by the search results and selected by users are stored in navigation logs 116. The query logs 114 and the navigation logs 116 define search history data that include data from and related to previous search requests associated with unique identifiers. The navigation logs 116 represent actions taken responsive to search results provided by the search engine 110. The query logs 114 and navigation logs 116 can be used to map queries submitted by user devices to resources that were identified in search results and the actions taken by users when presented with the search results in response to the queries. In some implementations, data are associated with the identifiers from the search requests so that a search history for each identifier can be accessed. The navigation logs 116 and query logs 114 can thus be used by the search engine to determine the respective sequences of queries submitted by the user devices, the actions taken in response to the queries, the times of those actions, and how often the queries have been submitted.

Additionally, the navigation logs 116 may also store information related to direct user input of an address of a resource. For example a user may type a URL in a browser directly, or may select a URL from a bookmark. Provided the user is, for example, signed into an account on the search engine, the navigation logs may also take into account direct user inputs and other navigation actions, such as requesting resources by selecting hyperlinks. The navigation logs 116 can also include, for example, data obtained from network monitoring systems, e.g., routers, proxy servers, firewalls, or other hardware or software systems that are associated with user devices and monitor communications by the user devices over the network 102. As another example, the navigation logs 116 can include data obtained from publishers or other entities that maintain resources. For example, this data can be obtained from software applications running on web servers that host the resources or from a client-side script included in resources maintained by the publishers.

The index 112, query logs 114 and the navigation logs 116 are processed to generate site data 118. The site data 118 describes websites and includes data that characterizes visits to particular resources of the websites by users and durations of each of those visits. For example, the visit data can identify clicks by users on search results included in search results web pages or direct inputs of URLs, and, for each of the selections and inputs, a measurement of the duration of time that elapsed between the time that the user requested the resource and the time that the user device requested another resource.

The obtained data characterizes user visits to resources and the durations of those visits. In this data, the duration of a visit can be measured in any of a variety of ways. For example, the duration of a visit can be measured as the time between the time that a user initiates a request for a resource, e.g., by clicking on a link to the resource or entering a resource locator for the resource into an input field provided by an application program running on the user device or an add-on to the application program, and the time that the user initiates another request for another resource. Alternatively, the duration may be measured as, e.g., the time between the time that a resource is fully rendered by the application program and the time that the user initiates another request for another resource.

In situations where the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personal identifiable information can be determined from the user, or a user's geographic location may be generalized where location information is obtained (such as to a city, ZIP code, or state level), so that a particular location of a user cannot be determined. Thus, the user may have control over how information is collected about the user and used by a content server.

Category data 120 are data that defines a category hierarchy and subcategories. The category hierarchy is an ontology scheme for organizing resources and websites by categorizing the resources and websites as belonging to particular categories. For example, general categories may include news, sports and science. Subcategories in news may include international, national, and local news; subcategories in sports may include soccer, baseball and football; and so on. Each subcategory may also include multiple subcategories.

A process external to the search engine may categorize the resources and websites. In some implementations, the resources are individually categorized, and the websites are then categorized based on the resource categories. Each resource and website may also belong to more than one category, and each categorization may be reflected by a category weight that is a measure of strength of association of the category to the resource and/or website. For example, a resource that includes a news story on a professional athlete launching a chain of restaurants may have category weights that respectively reflect moderate relevancies for the categories of news, sports, and dining Conversely, a resource that includes a news story regarding an international conflict may have a category weight reflecting a very high relevance for the category of international news.

Website Duration Performance Scoring

In some implementations, the search engine 110 includes a website category scoring engine 130. The website category scoring engine 130 processes the site data 118 and the category data 120 and generates, for each website, a duration performance score for the website. The duration performance score is a score that measures a category-dependent duration score for each website against other websites. The duration performance scores can be used in scoring resources and websites for search operations. The search operations may include scoring resources for search results, prioritizing the indexing of websites, suggesting resources or websites, protecting particular resources or websites from demotions, precluding particular resources or websites from promotions, or other appropriate search operations.

Figure 2:
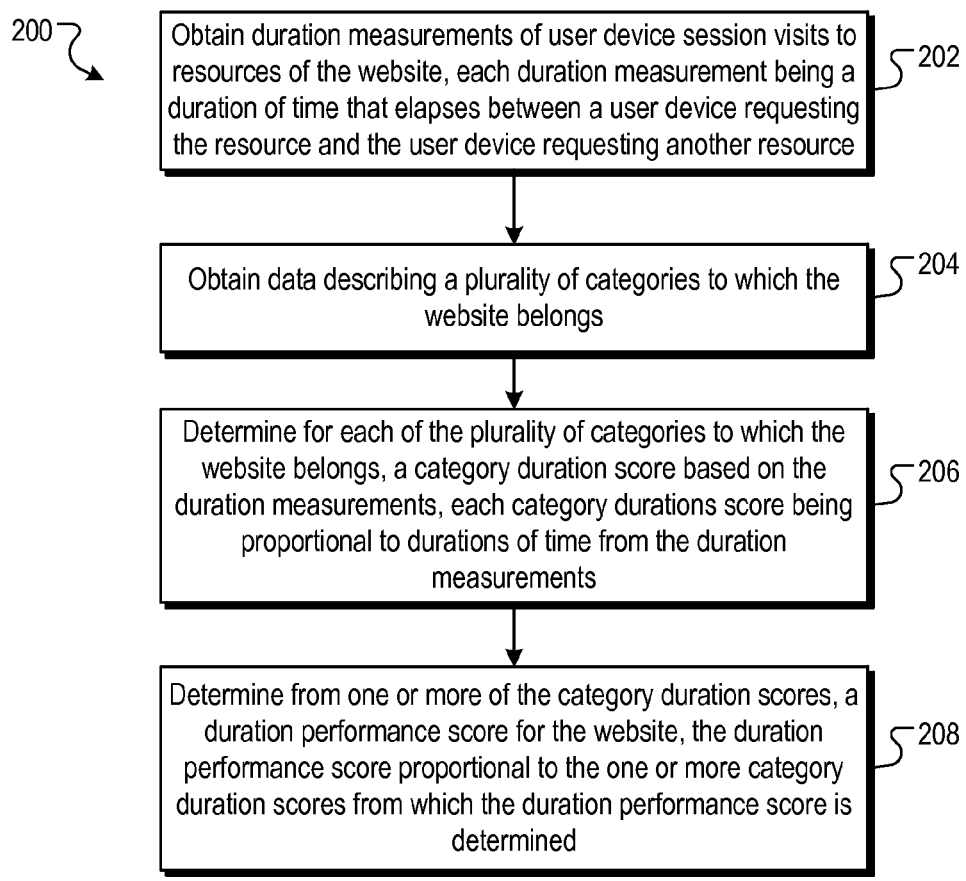
FIG. 2 is a flow chart of an example process for determining website duration scores.

Operation of the web category scoring engine 130 is described with reference to FIG. 2, which is a flow chart of an example process 200 for determining website category durations. The process 200 is implemented in one or more computers that are programmed to perform the operations of the web category scoring engine 130, and is performed for each website for which a duration performance score is to be determined.

The process 200 obtains duration measurements of user device session visits to resources of the website, each duration measurement being a duration of time that elapses between a user device requesting the resource and the user device requesting another resource (202). The duration data may be session based. As used in this description, a session is defined by one or more user device actions taken at a website, and, optionally, an action taken to arrive at the website, and that are received and grouped together. For example, a session may be a set of requests for website resources received during a predefined time period, e.g., 30 minutes; or may be up to N requests, e.g., up to 10 inputs; or may be a period during which a user maintained interactions with the user device until an inactivity time out (e.g., ten minutes) occurred. The user device session visits are a sequence visits to resources of the website without an intervening visit to a resource of another website. User device session visits, in some implementations, may also take into account at least one metric, such as time, for a resource from another website immediately prior to visiting a resource at the website. Other appropriate criteria to define a session can also be used.

For example, assume that actions taken at a user device resulted in the following sequence of duration measurements for resources at websites S0 and S1:

TABLE 1

| Duration (Sec) | Resource/Site |
|---|---|
| 160 | R0/S0 |
| 120 | R1/S1 |
| 98 | R2/S1 |
| 122 | R3/S1 |
| 11 | R4/S1 |
| 34 | R5/S1 |
| 140 | R6/S1 |
| 76 | R7/S1 |

After requesting resource R7, the user device then requests a resource from another website—e.g., resource R8 from website S2. Accordingly, the duration measurements for user device session visits for the particular device are defined as above in Table 1. For each website, there will be multiple sessions for which user device session visits are available.

In some implementations, session may be "suspended." For example, suppose a browser has two tabs, and the tabs are respectively open on different websites—S1 and S2. When a user switches tabs, e.g., placing a tab for the website S1 in an inactive state, the session for the website S1 is only suspended, and not ended. When the user switches back to the first tab, making the tab for website S1 active again, the session resumes, and the duration for the particular resource active in the tab resumes incrementing.

The process 200 obtains data describing a plurality of categories to which the website belongs (204). For example, the website category scoring engine 130 accesses the category data 120 to that specifies categories of websites and resources.

The process 200 determines, for each of the plurality of categories to which the website belongs, a category duration score based on the duration measurements, each category durations score being proportional to durations of time from the duration measurements (206). In some implementations, to determine the category duration scores, a single website duration score is determined for a website, and then the duration score is used to generate category duration scores for the website. From these category duration scores, the duration performance score for the website is determined. This process is described with reference to FIGS. 3A-3C.

The process 200 determines, from one or more of the category duration scores, a duration performance score for the website (208). The duration performance score is, in some implementations, proportional to the one or more category duration scores from which the duration performance score is determined (208). For example, the duration performance score may be based on all of the category duration scores for the website. Alternatively, the duration performance score may be based a proper subset of the category duration scores for the website. Calculation of the duration performance score is described in more detail below.

Category Duration Scores

In some implementations, a single website duration score is determined for all duration measurements for the website, and this website duration score (WDS) is used to generate category duration scores for the website. The category duration scores are then used to generate the duration performance score for the website.

Figure 3A:
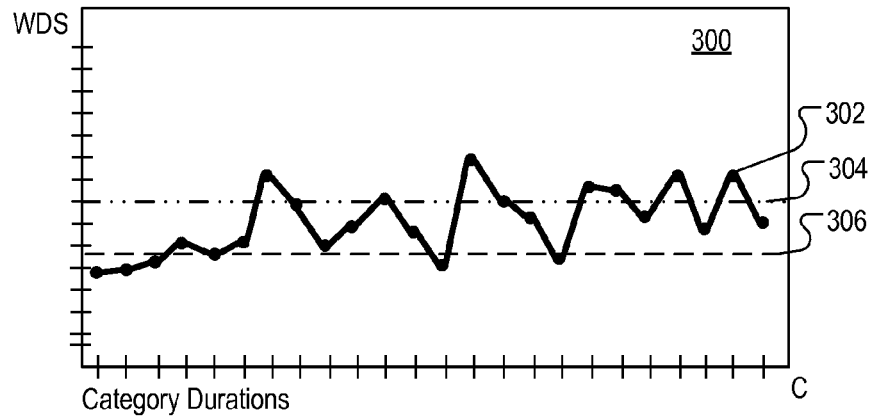
FIG. 3A is a graph of example website durations for two websites based on category durations.
Figure 3B:
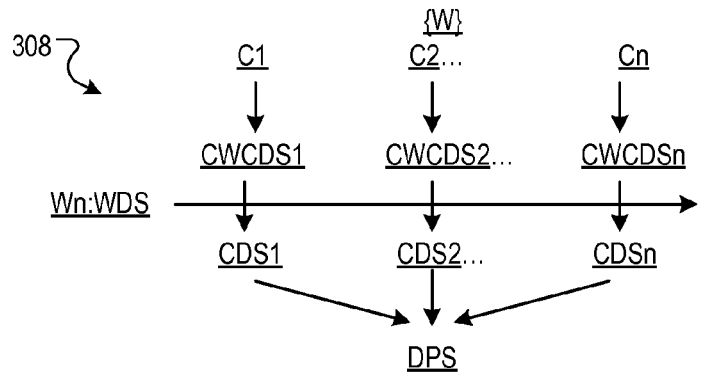
FIG. 3B is an entity diagram depicting category durations.

FIG. 3A is a graph 300 of example website durations for two websites based on category durations, and FIG. 3B is an entity diagram 308 depicting category durations. The vertical axis of the graph 300 is a website duration score scale, and the horizontal axis depicts various categories. The points defining the line 302 represents a central tendency (e.g., a median, or, alternatively, a mean), of website duration score WDS of the websites {W} that belong to the particular categories Cx. The lines 304 and 306 are website duration scores of two particular websites.

Figure 3C:
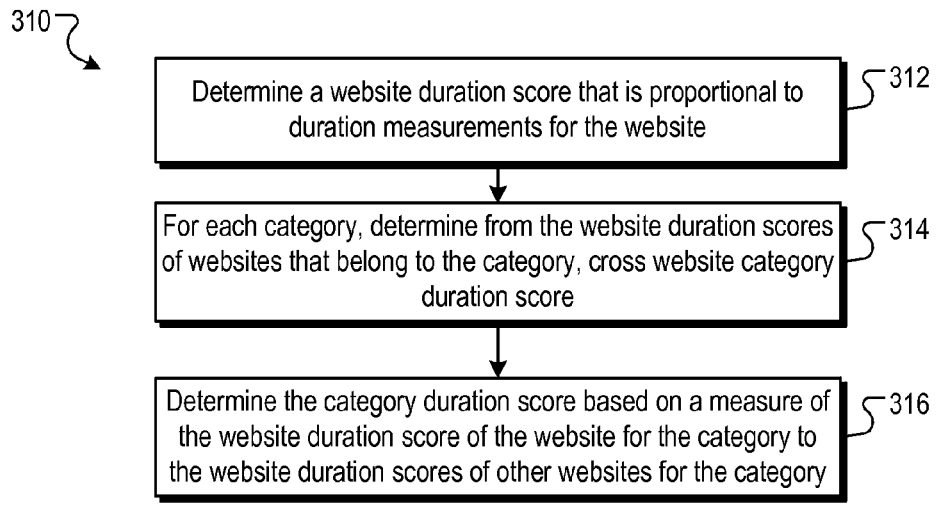
FIG. 3C is a flow chart of an example process for determining a website duration score.

FIG. 3C is a flow chart of an example process 310 for determining a category duration score, and reference is made to FIGS. 3A and 3B to illustration the operation of the process 310. The process 310 is implemented in one or more computers that are programmed to perform the operations of the web category scoring engine 130.

The process 310 determines a website duration score (WDS) that is proportional to duration measurements for the website (312). The website duration score is determined for each website to be scored. For example, from all the duration scores of all resources that belong to a website W, a website duration score is determined. The website duration score may be, for example, a median duration time computed from the website duration times.

In some implementations, a duration time is computed for each session, and the duration times for the sessions are used to compute the website duration score. For example, from Table 1 above, a duration time of 601 seconds is computed. Likewise, duration times for other sessions for the website are determined, and the duration times for each session are used to determine the website duration score for the website.

In some implementation, a last visited duration time is discounted when determining a duration time for a session. The last visited duration time corresponds to the duration measurement generated in response to a user device requesting a resource from the website and requesting a resource from another, different website. The discounting is done, for example, to filter out "short clicks," when a search result is selected and then the user navigates back to a search results page, or when a single visit to a website is lengthened due to page loading delays. Another reason for discounting the last visited duration time is that last visited duration times may be susceptible to other noise factors, such as a user leaving a computer with a resource displayed, and then coming back an hour later and immediately navigating to another resource of another website. For example, when discounting the last visited duration time from Table 1 above, a duration time of 525 seconds is computed.

In some implementation, a prior visited duration time is added when determining a duration time for a session. The prior visited duration time corresponds to the duration measurement generated on a last resource visited at first website immediately before selecting a first resource at a second website. For example, in Table 1 above, duration measurement for the resource R0 at websites S0 is 160 seconds. This is a prior visited duration for the durations for resources R1-R7. Thus, when discounting the last visited duration time from Table 1 above and taking into account the prior visited duration, a duration time of 685 seconds is computed.

In some implementations, each duration measurement generated in response to a user device requesting a resource in response to direct user input of an address of the resource is boosted. Such direct input is indicative of a positive user assessment of quality, and thus the duration time for that resource is boosted. The boost value may be a fixed value, or may be proportional to the frequency or quantity with which the address is directly input by users. For example, assume the boost factor is 1.5, and also assume discounting of the last visited duration time is also used. From Table 1 above, if the first resource is requested in response to a direct user input, a website duration time of 585 seconds is computed.

Then, for each category C, the website duration scores of websites that belong to that category are used to determine a cross-website category duration score (CWCDS) for that category (314). For example, suppose the websites W1-Wn are the only websites that belong to the category C1 and C2, and the websites W1-Wx are the only websites that belong to the category C3. The median scores for C1 and C2 would be the same, while the median score for the category C3 would be different from the median scores for C1 and C2. Alternatively, in some implementations, the data describing the categories to which the websites belong includes, for each category and each website, a category weight that is a measure of strength of association of the category to the website. In these situations, because the weights may differ for each website, the website duration scores for websites that belong to the same category may differ based on the weights. For example, the weights may be used to scale the website duration score for each category when determining the cross website category duration scores.

After the duration times of the sessions are processed for the websites and the cross website category durations are determined, the data describing graph lines 302, 304 and 306 are available. Assume the data for the line 302 represents a percentile threshold, e.g., a $50^{th}$ cross-website category duration score percentile threshold for each category at each point. Thus, for each category, a value below the line indicates a website with a website duration score less than the $50^{th}$ percentile threshold for the category, and a value above the line indicates a website with a website duration score greater than the 50th percentile threshold for the category. Other thresholds and other scales can also be used.

For each website, the process 310 then determines category duration scores for the website based on a measure of the website duration score WDS of the website compared to the website duration scores of other websites for the category (316). For example, as shown in FIG. 3A, the website duration score for two websites is shown by lines 304 and 306. This is also depicted in FIG. 3B for a particular website Wn that belongs to categories C1 . . . Cn.

A variety of scoring techniques can be used. In some implementations, the website duration score is a binary score. If the website duration score of the website exceeds the percentile threshold, then the score for the category is 1.0; otherwise, the score is 0.0.

Alternatively, in some implementations, the website duration score is a score that is proportional to the percentile rank of the website duration score of the website for the category. For example, each category durations score CDS for categories for which the website exceeds the percentile threshold may be a positive value that is proportional to the percentile difference between the category durations score and the percentile threshold, and each category durations score CDS for categories for which the website does not exceed the percentile threshold may be a negative value that is proportional to the percentile difference between the category durations score and the percentile threshold.

Other scoring technique can also be used. For example, instead of a percentile threshold, a median of all website duration scores for a category can be used as cross website category duration score. Each category duration score of a category for a website is then a score that is function of the difference between the website duration score of the website and the cross website category duration score of the category.

In some implementations, the category weights for the website can also be used to modify the category duration scores for the website. For example, the weights may be used to scale the category duration score for each category when determining the category duration scores for a website, e.g., by generating a product of the category duration score and the category weight for the website.

Duration Performance Score

The website category scoring engine 130 determines, from one or more of the category duration scores, a duration performance score for the website. In some implementations, duration performance score is not category specific and is determined from each of the category duration scores, e.g., for a particular website Wn, the duration performance score DPS is:

$$DPS(Wn) = f(CDS1n, CDS2n \ldots CDSkn)$$

A variety of appropriate scoring functions can be used. For example, in implementations where the category duration scores are binary scores, the duration performance scores may be based on a first count of category duration scores that meet the threshold and a second count of a total number of category duration scores for the website. For example, if the website belongs to 20 categories, and 12 of the category performance scores exceed the threshold, the duration performance score may be 12/20, or 0.6.

In variations of this implementation, the binary scores can be scaled by the category weights. This prevents skewing of the duration performance score when a website performs well for a category but is otherwise only marginally relevant to the category.

In implementations where the category duration scores are not binary scores, the duration performance scores may be based on a function that generate an output that is based on category duration scores, and, optionally, the category weights. A variety of functions can be used, such as a sigmoid, a function that asymptotically approaches an upper limit, or other functions.

In other implementations, the duration performance score is category specific. For example, during a search operation, the search engine 110 can determine categories to which a search session corresponds. Thus, assume the search engine 110 determines that a query or previous queries for a session indicate a user is primarily interested in the entertainment categories of movies and music. The website category scoring engine 130 determines, at query time, duration performance scores for each website based on the category duration scores for the entertainment categories of movies and music; the other category duration scores of the websites are ignored. The duration performance score scoring algorithms described above can be used, but the inputs are filtered and/or weighted based on the categories that are determined to be relevant to the particular search operation.

In addition to scoring resources for search operations, the duration performance scores can also be used for prioritizing the indexing of websites, suggesting resources or websites, protecting particular resources or websites from demotions, precluding particular resources or websites from promotions, or other appropriate search operations.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one website or distributed across multiple websites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   for each website of a first plurality of websites, each website being a collection of resources served from a domain:
      obtaining, by a data processing apparatus, duration measurements of user device session visits to resources of the website for a plurality of different users, each duration measurement being a duration of time that elapses between a user device requesting the resource and the user device requesting another resource, and the user device session visits being a sequence of visits to resources of the website without an intervening visit to a resource of another website;
      determining a website duration score that is proportional to duration measurements for the website;
   determining, for each category to which second plurality of website belong, the second plurality of websites being a subset of the first plurality of websites, a cross-website category duration score for the category based on the website duration scores of the second plurality of websites, wherein the cross-website category duration score is a measure of duration scores of other websites that belong to the category;
   for each website of a first plurality of websites:
      obtaining, by the data processing apparatus, data describing a plurality of categories to which the website belongs;

determining, by the data processing apparatus, for only each category of the plurality of categories to which the website belongs, a category duration score for the category based on the website duration score for the website and the cross-website category duration score for the category; and determining, by the data processing apparatus, from one or more of the category duration scores, a duration performance score for the website, the duration performance score proportional to the one or more category duration scores from which the duration performance score is determined.

2. The method of claim 1, wherein, for each website:

the data describing a plurality of categories to which the website belongs includes, for each category, a category weight that is a measure of strength of association of the category to the website; and for each category, determining the category duration score further comprises determining the category duration score based on the category duration score and the category weight.

3. The method of claim 2, wherein determining the category duration score based on the category duration score and the category weight comprises determining a product of the category duration score and the category weight.

4. The method of claim 3, wherein determining the duration performance score proportional to the one or more category duration scores from which the duration performance score is determined comprises, for each website:

determining a first count of category duration scores that meet a threshold;

determining a second count of a total number of category duration scores for the website; and determining the duration performance score based on the first count and the second count.

5. The method of claim 1, wherein determining, for each of the plurality of categories to which the website belongs, the category duration score for the category based on the website duration score for the website, comprises discounting each duration measurement generated in response to a user device requesting a resource from the website and requesting a resource from another, different website.

6. The method of claim 1, wherein the duration measurements of user device session visits to resources of the website include a prior visited duration time corresponds to the duration measurement for a last resource visited another website immediately before selecting a first resource at the website.

7. A method performed by data processing apparatus, the method comprising:

for each of a plurality of websites, each website being a collection of resources served from a domain:

obtaining, by a data processing apparatus, duration measurements of user device session visits to resources of the website, each duration measurement being a duration of time that elapses between a user device requesting the resource and the user device requesting another resource, and the user device session visits being a sequence of visits to resources of the website without an intervening visit to a resource of another website;

obtaining, by the data processing apparatus, data describing a plurality of categories to which the website belongs;

determining, by the data processing apparatus, for each of the plurality of categories to which the website belongs, a category duration score based on the duration measurements, each category durations score being proportional to durations of time from the duration measurements; and determining, by the data processing apparatus, from one or more of the category duration scores, a duration performance score for the website, the duration performance score proportional to the one or more category duration scores from which the duration performance score is determined;

wherein determining the duration performance score proportional to the one or more category duration scores from which the duration performance score is determined comprises, for each website:

determining a first count of category duration scores that meet a threshold;

determining a second count of a total number of category duration scores for the website; and determining the duration performance score based on the first count and the second count.

8. A method performed by data processing apparatus, the method comprising:

for each of a plurality of websites, each website being a collection of resources served from a domain:

obtaining, by a data processing apparatus, duration measurements of user device session visits to resources of the website, each duration measurement being a duration of time that elapses between a user device requesting the resource and the user device requesting another resource, and the user device session visits being a sequence of visits to resources of the website without an intervening visit to a resource of another website;

obtaining, by the data processing apparatus, data describing a plurality of categories to which the website belongs;

determining, by the data processing apparatus, for each of the plurality of categories to which the website belongs, a category duration score based on the duration measurements, each category durations score being proportional to durations of time from the duration measurements; and determining, by the data processing apparatus, from one or more of the category duration scores, a duration performance score for the website, the duration performance score proportional to the one or more category duration scores from which the duration performance score is determined;

wherein determining, for each of the plurality of categories to which the website belongs, the category duration score based on the duration measurements comprises boosting each duration measurement generated in response to a user device requesting a resource from the website in response to direct user input of an address of the resource, and not boosting each duration measurement generated in response to a user device requesting a resource from the website in response to a selection of a search result that references the resource.

9. A system, comprising:

a data processing apparatus; and a computer readable storage device storing instructions executable by the data processing apparatus and that upon such execution cause the data processing apparatus to perform operations comprising:

for each website of a plurality of websites, each website being a collection of resources served from a domain:

obtaining duration measurements of user device session visits to resources of the website for a plurality of different users, each duration measurement being a duration of time that elapses between a user device requesting the resource and the user device requesting another resource, and the user device session visits being a sequence of visits to resources of the website without an intervening visit to a resource of another website;

determining a website duration score that is proportional to duration measurements for the website;

determining, for each category to which second plurality of website belong, the second plurality of websites being a subset of the first plurality of websites, a cross-website category duration score for the category based on the website duration scores of the second plurality of websites, wherein the cross-website category duration score is a measure of duration scores of other websites that belong to the category;

for each website of a first plurality of websites:

obtaining data describing a plurality of categories to which the website belongs;

determining, by the data processing apparatus, for only each category of the plurality of categories to which the website belongs, a category duration score for the category based on the website duration score for the website and the cross-website category duration score for the category; and determining from one or more of the category duration scores, a duration performance score for the website, the duration performance score proportional to the one or more category duration scores from which the duration performance score is determined.

10. The system of claim 9, wherein, for each website:

the data describing a plurality of categories to which the website belongs includes, for each category, a category weight that is a measure of strength of association of the category to the website; and for each category, determining the category duration score further comprises determining the category duration score based on the category duration score and the category weight.

11. The system of claim 10, wherein determining the category duration score based on the category duration score and the category weight comprises determining a product of the category duration score and the category weight.

12. The system of claim 11, wherein determining the duration performance score proportional to the one or more category duration scores from which the duration performance score is determined comprises, for each website:

determining a first count of category duration scores that meet a threshold;

determining a second count of a total number of category duration scores for the website; and determining the duration performance score based on the first count and the second count.

13. The system of claim 9, wherein determining, for each of the plurality of categories to which the website belongs, the category duration score for the category based on the website duration score for the website, comprises discounting each duration measurement generated in response to a user device requesting a resource from the website and requesting a resource from another, different website.

14. The system of claim 9, wherein the duration measurements of user device session visits to resources of the website include a prior visited duration time corresponds to the duration measurement for a last resource visited another website immediately before selecting a first resource at the website.

15. A system, comprising:

a data processing apparatus; and a computer readable storage device storing instructions executable by the data processing apparatus and that upon such execution cause the data processing apparatus to perform operations comprising:

for each of a plurality of websites, each website being a collection of resources served from a domain:

obtaining duration measurements of user device session visits to resources of the website, each duration measurement being a duration of time that elapses between a user device requesting the resource and the user device requesting another resource, and the user device session visits being a sequence of visits to resources of the website without an intervening visit to a resource of another website;

obtaining data describing a plurality of categories to which the website belongs;

determining for each of the plurality of categories to which the website belongs, a category duration score based on the duration measurements, each category durations score being proportional to durations of time from the duration measurements; and determining from one or more of the category duration scores, a duration performance score for the website, the duration performance score proportional to the one or more category duration scores from which the duration performance score is determined;

wherein determining the duration performance score proportional to the one or more category duration scores from which the duration performance score is determined comprises, for each website:

determining a first count of category duration scores that meet a threshold;

determining a second count of a total number of category duration scores for the website; and determining the duration performance score based on the first count and the second count.

16. A system, comprising:

a data processing apparatus; and a computer readable storage device storing instructions executable by the data processing apparatus and that upon such execution cause the data processing apparatus to perform operations comprising:

for each of a plurality of websites, each website being a collection of resources served from a domain:

obtaining duration measurements of user device session visits to resources of the website, each duration measurement being a duration of time that elapses between a user device requesting the resource and the user device requesting another resource, and the user device session visits being a sequence of visits to resources of the website without an intervening visit to a resource of another website;

obtaining data describing a plurality of categories to which the website belongs;

determining for each of the plurality of categories to which the website belongs, a category duration score based on the duration measurements, each category durations score being proportional to durations of time from the duration measurements; and determining from one or more of the category duration scores, a duration performance score for the website, the duration performance score proportional to the one or more category duration scores from which the duration performance score is determined;

wherein determining, for each of the plurality of categories to which the website belongs, the category duration score based on the duration measurements comprises boosting each duration measurement generated in response to a user device requesting a resource from the website in response to direct user input of an address of the resource, and not boosting each duration measurement generated in response to a user device requesting a resource from the website in response to a selection of a search result that references the resource.

17. A computer readable storage device storing instructions executable by the data processing apparatus and that upon such execution cause the data processing apparatus to perform operations comprising:

for each website of a plurality of websites, each website being a collection of resources served from a domain:
obtaining duration measurements of user device session visits to resources of the website for a plurality of different users, each duration measurement being a duration of time that elapses between a user device requesting the resource and the user device requesting another resource, and the user device session visits being a sequence of visits to resources of the website without an intervening visit to a resource of another website;

determining a website duration score that is proportional to duration measurements for the website;

determining, for each category to which second plurality of website belong, the second plurality of websites being a subset of the first plurality of websites, a cross-website category duration score for the category based on the website duration scores of the second plurality of websites, wherein the cross-website category duration score is a measure of duration scores of other websites that belong to the category;

for each website of a first plurality of websites:
obtaining data describing a plurality of categories to which the website belongs;
determining, by the data processing apparatus, for only each category of the plurality of categories to which the website belongs, a category duration score for the category based on the website duration score for the website and the cross-website category duration score for the category; and
determining from one or more of the category duration scores, a duration performance score for the website, the duration performance score proportional to the one or more category duration scores from which the duration performance score is determined.

* * * * *